United States Patent [19]
Berry

[11] Patent Number: 5,150,109
[45] Date of Patent: Sep. 22, 1992

[54] VGA CONTROLLER CARD

[75] Inventor: Wayne F. Berry, Palm Springs, Calif.

[73] Assignee: Touchstone Computers, Inc., Tustin, Calif.

[21] Appl. No.: 310,398

[22] Filed: Feb. 13, 1989

[51] Int. Cl.$^5$ .............................................. G09G 3/00
[52] U.S. Cl. .................................. 340/811; 340/703; 340/717
[58] Field of Search .............. 340/717, 716, 784, 814, 340/703, 811, 744; 364/521

[56] References Cited

U.S. PATENT DOCUMENTS

| | | | |
|---|---|---|---|
| 4,536,856 | 9/1984 | Hiroishi | 340/716 |
| 4,760,387 | 7/1988 | Ishii et al. | 340/717 |
| 4,835,530 | 5/1989 | Morita et al. | 340/744 |
| 4,897,812 | 1/1990 | Lessard et al. | 340/798 |
| 4,918,436 | 4/1990 | Johary | 340/799 |
| 4,926,166 | 5/1990 | Fujisawa et al. | 340/717 |

OTHER PUBLICATIONS

Williams, Tom, "Chip Set Tackles Laptop Design Issues, Offers Flat-Panel VGA Controls", *Computer Design*, Oct. 15, 1988.

Video Seven (brochure).
Franklin, Jr., Curtis, "Enhanced EGA and VGA Boards", *BYTE the Small Systems Journal*, Mar. 1988, pp. 102-106, 108-110, 112.
Rosch, Winn, L., "Nearing Perfection VGA Boards Enter the Mainstream", *PC Magazine*, Jul. 1988, pp. 93-98, 100, 102-103, 106-108, 111, 116-118, 120, 124.

*Primary Examiner*—Alvin E. Oberley
*Assistant Examiner*—Xiao Min Wu
*Attorney, Agent, or Firm*—Stetina and Brunda

[57] ABSTRACT

A bus mountable Video Graphic Array (VGA), controller card for IBM personal computer family products, including the PC, PC/XT, PC/AT, and PS/2 computers and completely compatable clone computer products to provide VGA standard signals to drive conventional Cathode Ray Tube, (CRT) and flat panel displays is disclosed. The VGA controller card is hardware compatable to the IBM PC family products; functions to provide VGA standard signals capable of driving flat panel displays and converts standrad PS/2 VGA signals to simultaneously drive conventional CRT and flat panel displays.

5 Claims, 2 Drawing Sheets

VGA CONTROLLER CARD

BACKGROUND OF THE PRESENT INVENTION

The present invention relates generally to data processing and display systems, and more particularly to a bus mountable VGA controller card for use on IBM personal computer products namely, the IBM PC, PC/XT, PC/AT, and PS/2 and their one-hundred percent compatable clone computer products (hereinafter collectively referred to as IBM PC computers) to provide VGA (video graphic array) standard signals to drive conventional cathode ray tube (CRT) and flat panel displays. (IBM, PC/XT, and PC/AT are registered trademarks of International Business Machines).

Since initial introduction in the late-1960's, the personal computer has become the mainstay of both small and large businesses alike. With specific reference to IBM PC Computers, there has been a recent demand for enhanced video graphic capability to allow such personal computers to meet the more sophisticated demands of the marketplace. Pursuant to this demand, EGA (enhanced graphic array) graphics became the initial industry standard for business applications of personal computers which EGA standard offered a 640 by 350 pixel by 16 color resolution. By use of such EGA standards on the IBM PC computers and ther industry standard clones, such IBM personal computers were capable of providing video graphics to personal computer users.

In recognizing the substantial demand for improved video graphic capability on personal computers, International Business Machines (IBM) in 1987 introduced its PS/2 (trademark of International Business Machines) personal computer which adopted a new graphic standard, i.e. the VGA standard. Unlike the EGA standard, the VGA standard is able to both read and write hardware registers and offers increased 640×480 color resolution. The new IBM VGA standard as adopted on the IBM PS/2 computer, has been recognized as providing a substantial improvement in the art, and use of the standard is contemplated far into the future.

In view of the enhanced graphic capabilities of the VGA standard, owners of the previous PC, PC/XT and PC/AT personal computers have been faced with the decision of either purchasing a new PS/2 system which possesses the new VGA standard, or alternatively attempting to upgrade their existing PC, PC/XT, or PC/AT system to emulate the VGA standard. As will be recognized, the purchasing of the new PS/2 system proves to be a costly capital expenditure and hence is prohibitive. In relation to such upgrading to the VGA standard, VGA boards have recently been introduced into the marketplace which may be installed upon the IBM PC, PC/XT or PC/AT computers to emulate the new VGA standard. Examples of such VGA boards comprise those manufactured by Everex, Intelligent Data Systems, Paradise Systems, Sigma Designs, Tatung, Taxan, Tecmar, and Video Seven. Such VGA boards have generally failed to be completely interchangeable in functionality with the VGA standard because they typically embodied only (basic input output system) compatability and not hardware register compatability (hardware compatability) with the VGA standard. As such, the prior art VGA boards, although touting to be the functional equivalent of the VGA standard of the PS/2 system have generally failed to be completely 100% compatable with the same. As such there exists a substantial need in the art for an improved VGA controller card or board which is 100% compatable with IBM PC computers to provide VGA standard signals to drive conventional CRT displays.

In addition, in recent years, flat panel displays have been introduced into the marketplace which serve as a dominant future substitute for conventional CRT display systems. The advantage of such flat panel displays over conventional CRT displays is their reduced power consumption, reduced physical size and reduced costs as well as improved environmental aspects such as reduced radiation exposure and/or leakage. Although the prior art VGA boards discussed above have been developed for use with conventional CRT displays, they have been completely unavailable for use on flat panel displays due the different timing frequencies and operational characteristics associated with the flat panel displays. As such, to date there is a substantial void in the prior art to allow VGA standard graphics for use with flat panel displays. Thus, there additionally exists a substantial need in the art for a VGA controller to enable use of the VGA standard on conventional flat panel displays.

Additionally, the VGA standard implemented through the PS/2 system is additionally incapable of being utilized to drive flat panel displays. Thus there exists a need in the art for a VGA controller which will enable implementation of the VGA standard on both flat panel displays and well as CRT display systems.

SUMMARY OF THE PRESENT INVENTION

The present invention specifically addresses and alleviates the above referenced deficiencies associated in the prior art. More particularly, the present invention comprises a bus mountable VGA controller card for use on IBM personal computers, namely the PC, PC/XT and PC/AT and PS/2 and their one-hundred percent compatable clone products to provide VGA standard signals to drive conventional CRT displays. In this regard, the VGA controller card of the present invention is one-hundred percent hardware compatable with the VGA standard, and hence comprises the first completely compatable VGA card for such IBM personal computers.

Additionally, the present invention comprises a VGA controller card which is specifically adapted for use to drive flat panel displays. In this regard, the present invention comprises means for preliminarily storing standard VGA signals in a register and outputting such standard VGA signals in a timed sequence sufficient for use on flat panel displays. As such, the present invention fills a significant void existing in the industry for use of VGA signals to drive flat panel displays.

In addition, the VGA controller of the present invention is specifically adapted to allow VGA signals to be independently and simultaneoustly used to drive conventional CRT and flat panel displays.

DESCRIPTION OF THE DRAWINGS

These as well as other features of the present invention will become more apparent upon reference to the drawings wherein.

DETAILED DESCRIPTION OF THE PREFERRED EMBODIMENT

Figure 1:
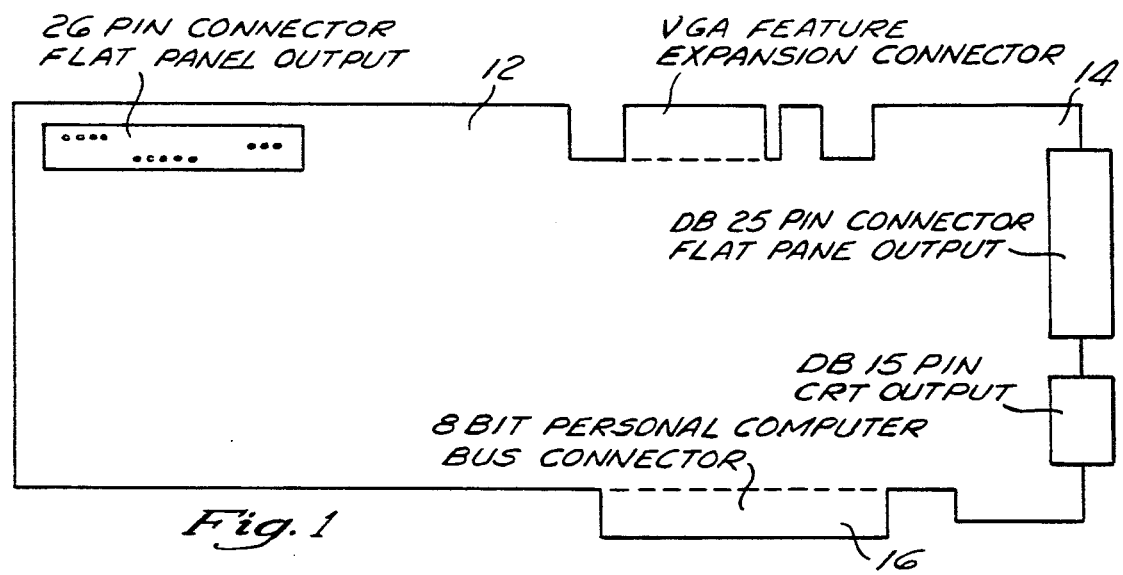
FIG. 1 is a depiction of the VGA controller card of the present invention illustrating the manner in which it may be mounted upon the bus of a personal computer.

Referring to FIG. 1, there is shown the VGA controller card 10 of the present invention composed generally of a printed circuit board 12 having overall dimensions dependent upon preferred implementation but typically approximately 5 inches by 8 inches and a conventional edge connector 14 suitable to allow plug in mounting upon a complementary mounting port (not shown) found on the bus of an IBM personal computer (not shown). An additional edge connector 16 is additionally provided for connection to conventional cables (not shown) extending to a conventional CRT display or flat panel display. As will become more apparent infra, a VGA controller card 10 of the present invention functions to provide VGA standard signals to drive conventional CRT displays as well as provide standard VGA signals in a time sequence sufficient for driving flat panel displays. Further, the VGA controller card 10 of the present invention is specifically adapted to allow VGA signals to be independently and simultaneously used to drive both conventional CRT and flat panel panel displays.

Figure 2:
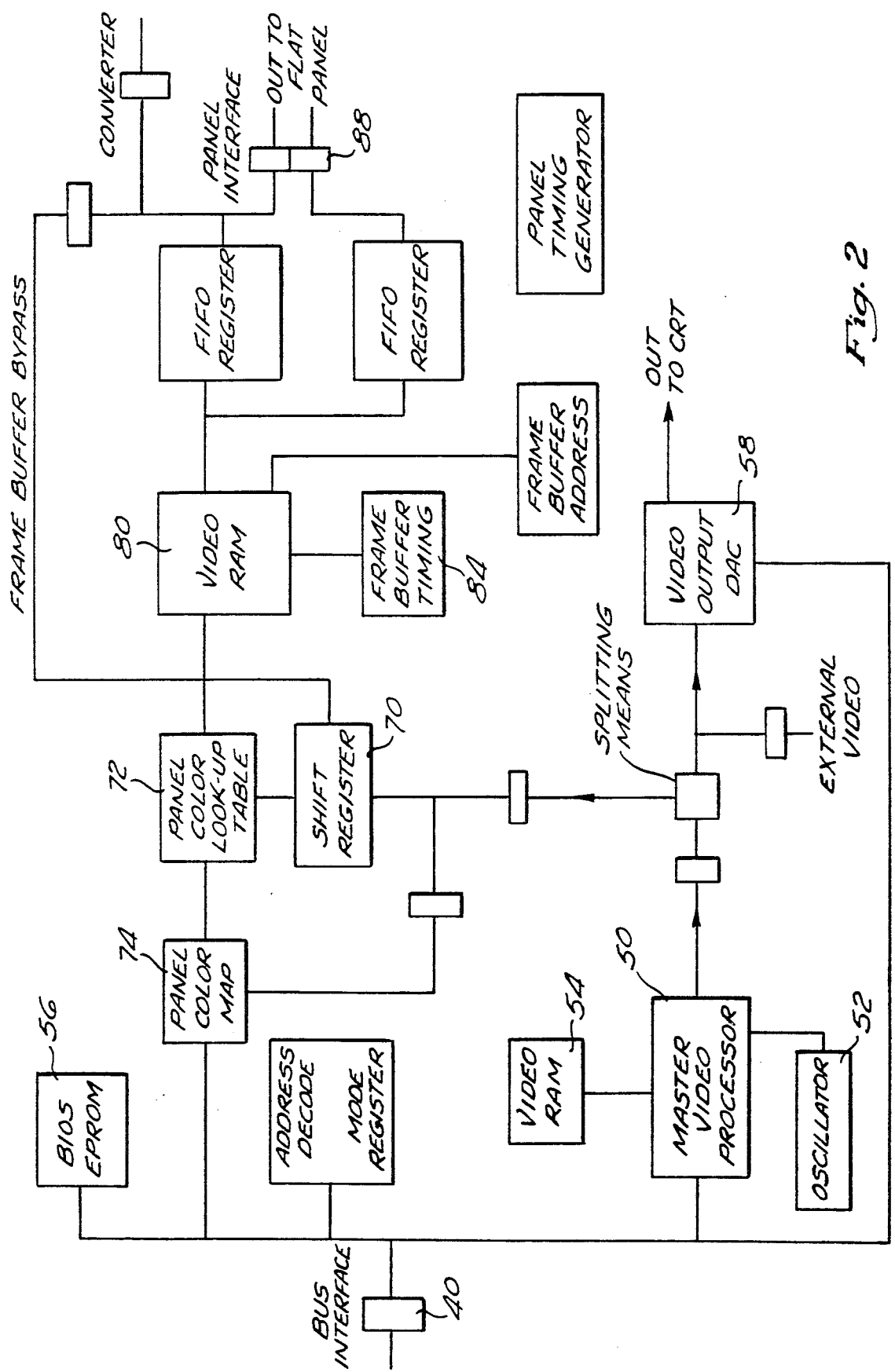
FIG. 2 is an electrical flow chart of the VGA controller card of the present invention.

Referring to FIG. 2, the particular architecture of the VGA controller 10 of the present invention is depicted. As shown, the architecture includes a conventional bus interface 40 whereby display signals are communicated to a master video processor 50 which in the preferred embodiment is implemented as an Intel 82706 video graphics array processor. This particular video graphics array processor comprises a VGA compatable display controller which is one-hundred percent register compatable with all IBM VGA standard operational modes and provides software compatability at the level with EGA, CGA and MDA standards. The processor 50 includes an oscillator clock 52, video RAM 54 and bios EPROM 56 which serve to output from the processor 50 a VGA standard signal. In the preferred embodiment, the clock 52, RAM 54 and EPROM 56 are preferably implemented as conventional crystal oscillators such as MTR or Toyocom 28.322 mHz, 25.175 mHz, 32.514 mHz TTL oscillator, a 64×4 dynamic random access memory such as a Fujitsu MB 81464-10 RAM and a 256,000 byte electronically programmable read only memory such as a Fujitsu MBM 27256-20 Eprom, respectively. The output VGA signal is subsequently utilized in a video output DAC 58 such as an Inmos G 171 RAMDAC or Brooktree BT 471/478 series RAM-DAC which includes a conventional color look up table. Subsequently, the signal from the video output 58 may be communicated to a conventional CRT (not shown).

As will be recognized, through the implementation of the VGA controller card 10 of the present invention as described supra, the output signal from the video output DAC 58 due to the one-hundred percent register compatible video graphics array processor 50 comprises the same VGA standard signal as generated from the IBM PS/2 system. As such, by use of the VGA controller card 10 of the present invention conventional IBM personal computers may be upgraded to the VGA standard in a simple and cost effective manner whereby VGA standard signals may be utilized to drive conventional CRT displays.

In the preferred embodiment, the VGA signal outputted from the processor 50 is split or branched such that the VGA signal is simultaneously input into the video output DAC 58 to drive a conventional CRT display in a manner described above as well as input into a flat panel display conversion circuit adapted to convert the standard VGA signal into a timed, synchronized data signal sufficient for driving conventional flat panel displays.

In this regard, as opposed to conventional CRT displays which utilize a conventional raster scanning display method, flat panel displays utilize a line scanning display method which require the VGA signal to be synchronized in time prior to output to the flat panel display. In this regard, conventional CRT display systems display pixels at a rate determined by hardware. This rate is variously known as the video bandwidth, the dot rate or the pixel rate and the oscillator that generates such a rate is conventionally known as a dot clock. Given the dot rate, differing CRT displays are programmed so that the horizontal and vertical scan frequencies sent to the CRT display are limited to frequencies the CRT display may handle. As opposed to conventional CRT display dot rates, conventional flat panel displays utilize differing dot rates which require modification, i.e. conversion of such CRT signals for timing functions suitable for driving flat panel displays.

The flat panel display conversion circuit utilize for this purpose comprises a conventional shift register 70 preferably implemented as a Texas Instruments LS 174 Serial in Parallel out register or equivalent register which stores the VGA signal output from the processor 50. A conventional panel color look up table 72 is utilized in conjunction with a panel color map 74 which serves to identify the VGA signals in relation to the particular color map utilized for the particular flat panel display. In this regard, it will be recognized that flat panel displays although functioning in a similar manner all have particular unique operating characteristics necessitating differing color maps and look up table data. In the preferred embodiment, the panel color map 74 comprises a 64 by 4 PROM such as that manufactured by Fujitsu while the color look up table 72 is preferably implemented as a Harris CY7C122 256×4 RAM. Subsequently, the VGA signal processed by the color map data is read into a frame buffer 80 for temporary storage. A frame buffer timer 84 is provided which is utilized to adjust the frequency and timing of the VGA signal for the particular flat panel display utilized. Basically, these frame buffer timing functions are dependant upon the particular operating characteristics of the implemented flat panel display and comprises a timing equation for each of the implemented flat panel displays defined by the manufacturer of the flat panel display.

Output from the frame buffer 80 is input into a pair of first-in, first-out registers preferrably implemented as an LS244 octal buffer with signals subsequently being entered into a flat panel interface 88 for connection to a conventional flat panel display.

Figure 3:
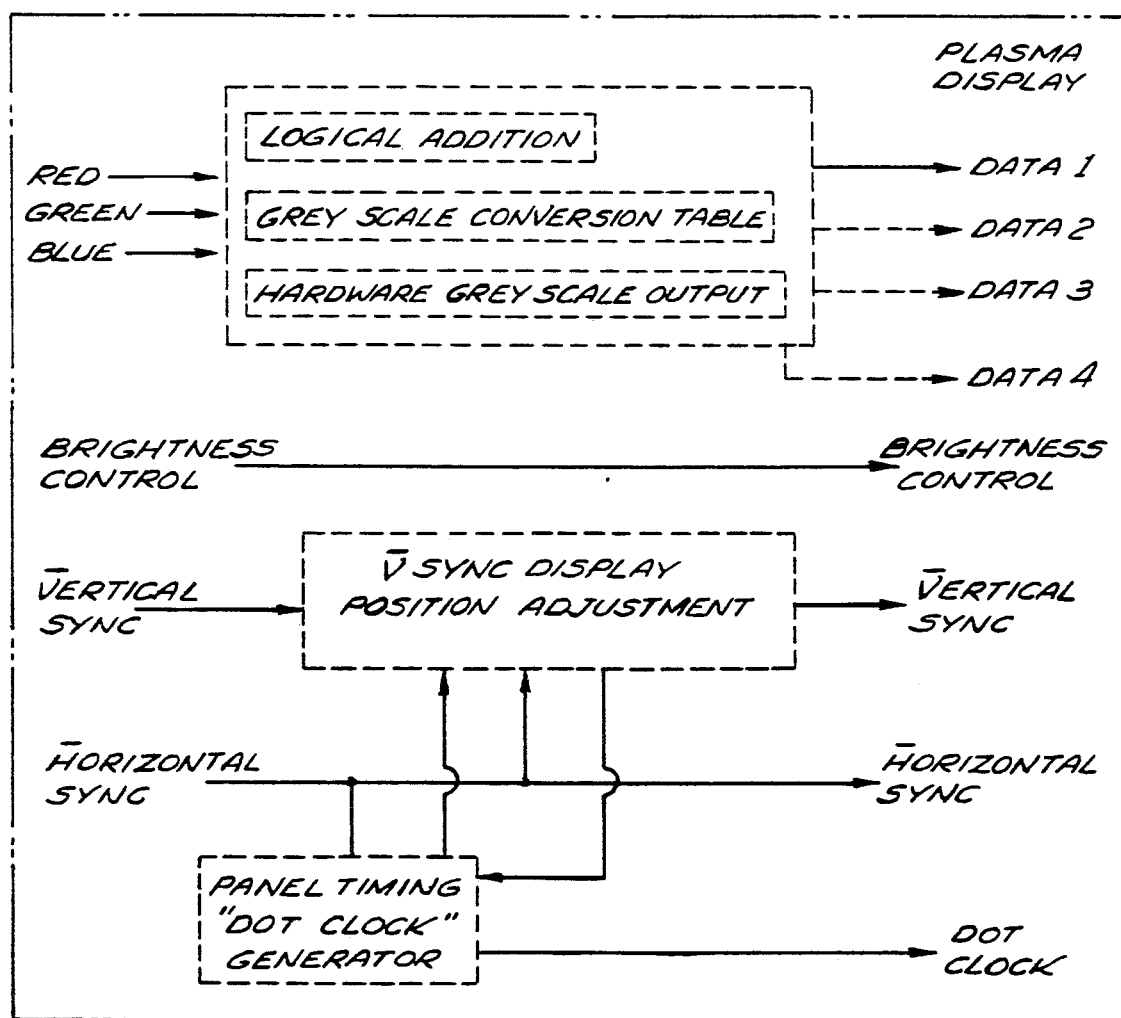
FIG. 3 is a schematic depiction of the manner in which the VGA standard signals for CRT displays are converted for driving flat panel displays.

Referring to FIG. 3, the manipulation or conversion of the VGA signals by way of the flat panel display conversion circuit described supra is illustrated As will be recognized, the VGA signal is composed of conventional red, green and blue signals, brightness control, vertical sync and horizontal sync signals. By way of the flat panel display conversion circuit, the red, green, blue (RGB) signals are processed by logical addition, a gray scale conversion table and hardware gray scale output to derive plural data signals suitable for driving flat panel displays. The brightness control signal is left unchanged in the conversion circuit while the vertical sync and horizontal sync are modified for display position adjustment and proper timing. As such, standard VGA signals are converted for driving flat panel displays.

With the structure defined, the operation of the VGA controller card 10 of the present invention may be described. In its first operative application, the VGA controller card 10 may be installed upon the bus of the IBM PC, PC/AT, or PC/XT computer system, whereby video signals are processed via the master video processor 50 and outputted to a video output 58 to drive a conventional CRT. Since the video processor 50 generates a VGA signal which is one-hundred percent register compatable with all IBM VGA modes and provides software compatability at bios level and EGA, CGA, and MDA the VGA card 10 of the present invention provides the first 100% hardware compatable VGA card for use on the IBM PC family computers.

In a second operative application, when installed upon the IBM PC family computer, VGA signals from the processor 50 are intercepted or divided prior to introduction into the video output 58 and are placed in a register 70 Subsequently, the panel color look up table 72 and panel color map 74 are utilized to output the VGA signal from the shift register into a frame buffer for temporary storage. Upon identifying the particular flat panel display desired to be utilized for display of the signal The frame buffer timer 84 outputs a properly synchronized VGA signal to the flat panel display As such in this second operative embodiment, the VGA controller card 10 of the present invention enables VGA graphic capability upon a flat panel display.

In a third operative embodiment, it will be recognized that the VGA controller card 10 of the present invention provides independent and simultaneous output of VGA signals to both a conventional CRT display as indicated in the first operative application discussed above, as well as flat panel displays as indicated in the second operative application discussed above. As such, the VGA card 10 of the present invention accommodates both CRT and flat panel display systems for VGA signals.

Finally, from the above description, it will be recognized that the VGA signal which is intercepted in the present invention for use in driving flat panel displays comprises the actual or same VGA standard signal generated upon the IBM PC/2 system. As such, the VGA controller card 10 of the present invention may be utilized upon an IBM PS/2 computer to enable the VGA signal generated therefrom to be processed in a manner previously described to generate a VGA signal suitable for driving flat panel displays which heretofore has been unavailable in the prior art.

Those skilled in the art will recognize that for purposes of description certain hardware implementations have been defined herein. However, modifications to such hardware specifications can be made without departing from the spirit of the present invention and such modifications are clearly contemplated herein.

What is claimed is:

1. A bus mountable VGA controller for use on personal computers comprising:
    (a) a circuit board having means for interfacing said circuit board to the bus of a personal computer;
    (b) a video graphics array processor for converting video signals presented on said bus to generate VGA standard signals; wherein said video graphics array processor is register compatible with VGA standard operational modes; wherein said video graphics array processor comprises an Intell 82706;
    (c) means for converting said VGA standard signals to a time synchronized video signal suitable for driving a flat panel display comprising;
        (i) register means for storing said VGA standard signal;
        (ii) color table and map means for identifying said stored VGA standard signal in reference to the flat panel display to be utilized;
        (iii) frame buffer means for storing said VGA standard signal processed by said color table and map means;
        (iv) timer means to adjust the frequency and timing of said VGA standard signal stored in said frame buffer means; and
        (v) first-in, first-out frame buffer means for outputting said VGA standard signal to a flat panel display; and
        (vi) means for converting said standard VGA signal from a raster scan display format to a line scan display format; and
    (d) a means for splitting a signal disposed between said video graphics array processor and said converting means, wherein said VGA standard signal is split into first and second VGA standard signal, said first VGA standard signal being applied to said converting means for driving a flat panel display and said second VGA standard signal being applied to an output DAC to drive a conventional CRT display.

2. The bus mountable controller for use on personal computers as recited in claim 1 wherein said register means comprises a Texas Instruments LS174 serial in, parallel-out register.

3. The bus mountable controller for use on personal computers as recited in claim 1 wherein said color table comprises a Harris CYC7C122 256×4 RAM.

4. The bus mountable controller for use on personal computers as recited in claim 1 wherein said color map comprises a Fujitsu 64×4 PROM.

5. The bus mountable controller for use on personal computers as recited in claim 1 wherein said first-in, first-out frame buffer means comprises an LS244 octal buffer.

* * * * *